(12) United States Patent
Ezbicki

(10) Patent No.: US 6,686,526 B2
(45) Date of Patent: Feb. 3, 2004

(54) PERCUSSION PRACTICE AID

(76) Inventor: Leonard E. Ezbicki, 60 Bellefontaine Ave., Framingham, MA (US) 01701

(*) Notice: Subject to any disclaimer, the term of this patent is extended or adjusted under 35 U.S.C. 154(b) by 0 days.

(21) Appl. No.: 09/981,109

(22) Filed: Oct. 17, 2001

(65) Prior Publication Data

US 2003/0070533 A1 Apr. 17, 2003

(51) Int. Cl.[7] .............................................. G10D 13/02
(52) U.S. Cl. ...................................... 84/411 R; 84/421
(58) Field of Search ............................. 84/411 R, 417, 84/421, 411 A, 411 P (56) References Cited

U.S. PATENT DOCUMENTS

| | | |
|---|---|---|
| 1,346,588 A | 7/1920 | Bower |
| 2,078,004 A | 4/1937 | Lebow |
| 2,565,225 A | 8/1951 | Gladstone |
| 3,453,924 A | 7/1969 | Glick et al. |
| 3,791,249 A * | 2/1974 | Frigo et al. ............... 84/411 R |
| 5,675,099 A * | 10/1997 | Granatello ............... 84/411 M |
| 5,892,169 A * | 4/1999 | Shapiro .................... 84/411 M |
| 6,362,407 B1 * | 3/2002 | Dennis et al. ........... 84/411 M |

OTHER PUBLICATIONS

Lambert t et al., "Beginning Percussionists with Good Fundamentals," *The Instrumentalist*, pp. 27–29, Jun. 1997. Packaging for Remco Muff'l.

* cited by examiner

*Primary Examiner*—Kimberly Lockett
(74) *Attorney, Agent, or Firm*—Wolf, Greenfield & Sacks, P.C.

(57) ABSTRACT

An instructional or practice aid for a percussion instrument, such as a drum. A barrier with an opening guides a drum player to strike a drumhead in predetermined areas. The barrier may be supported by the rim of the drum and may have a limited effect on the sound quality and volume of the drum playing.

25 Claims, 8 Drawing Sheets

PERCUSSION PRACTICE AID

FIELD OF THE INVENTION

The present invention relates to an apparatus and a method for practicing proper playing techniques on a percussion instrument, and more particularly to a barrier used for practicing proper playing techniques on a drum and an associated method.

DESCRIPTION OF THE RELATED ART

Figure 1:
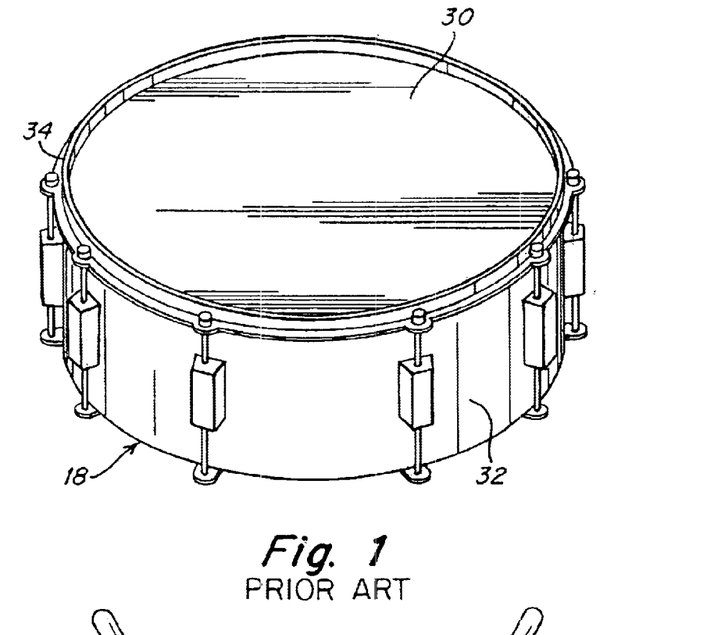
FIG. 1 is a perspective view of a snare drum.

As shown in FIG. 1, a drum 18, such as a snare drum, typically includes a drumhead 30 which is stretched tightly over a surrounding shell 32. In a snare drum and other like drums, drumhead 30 may be surrounded by a rim 34 which extends above the playing surface of drumhead 30. Drumsticks or other percussion implements are used to play the drum. It is well know that to generate the best sound quality, the drumhead 30 should be stricken by the drumsticks in the center of drumhead 30 at a point spaced from rim 34 or shell 32.

One aspect of learning to play a drum properly is learning to consistently hit drumhead 30 in or around its center. As a student looks at his or her music, however, the drumsticks may start to wander and strike other areas of drumhead 30. An untrained ear may not be able to discern the resulting difference in sound, and the student may not realize that he or she is not striking drumhead 30 at or near the center.

Practice pads, such as the one described in U.S. Pat. No. 2,565,225, are intended to assist in this learning experience. Such pads are formed of rubber and have a raised area in the center. The pad may be placed on a drumhead or other flat surface to practice drumming. Of course, the resulting sound is significantly different from that produced by drumsticks directly striking a drumhead, and the student does not fully appreciate the improved sound produced by proper drumming.

Another aspect of learning to play the snare drum properly is learning proper hand, wrist and arm positioning. Neither a drum nor the drum pad described in U.S. Pat. No. 2,565,225 guides a student to position his or her hands, wrists and arms in a certain manner because both may be stricken by drumsticks held with almost any hand, wrist and arm positioning.

SUMMARY OF THE INVENTION

One aspect of this invention relates to an apparatus for controlling the locations to be stricken on a playing surface of a percussion instrument. The apparatus includes a barrier having a first portion constructed and arranged to prevent a first area of a playing surface of a percussion instrument from being stricken, and a second portion constructed and arranged to allow a second area of the playing surface to be stricken. The barrier preferably is constructed and arranged to not directly contact the playing surface.

Another aspect of the invention relates to a practice aid for a drum that includes a drum guide having an opening. The drum guide is constructed and arranged to be supported by a rim of a drum. The drum guide covers a first portion of a drumhead, preferably the edge, and exposes a second portion of the drumhead aligned with the opening in the drum guide, which is preferably the center of the drumhead.

In another aspect of the invention, a method of practicing drum-playing techniques includes a step of blocking a first portion of a drumhead with a barrier such that when the drumsticks strike the barrier the drumhead is not directly stricken by the drumsticks. The method also includes a step of leaving a second portion of the drumhead exposed such that drumsticks can strike the second portion of the drumhead without the sound quality of the drumhead being significantly affected.

Another aspect of the invention relates to a combination of a percussion instrument barrier and a percussion instrument having a vibrating surface. The barrier is supported on the percussion instrument and has a blocking portion that blocks access to a first area of the vibrating surface by a percussion striking implement. The barrier also includes an opening which allows access to the vibrating surface by a percussion striking instrument. The barrier is vibrationally separated from the vibrating surface of the percussion instrument.

BRIEF DESCRIPTION OF THE DRAWINGS

The invention will be appreciated more fully with reference to the following detailed description of illustrative embodiments, when taken in conjunction with the accompanying drawings, wherein like reference characters denote like features, and in which.

DETAILED DESCRIPTION

In one aspect of this invention, a percussion instrument barrier provides a practice aid or guide that controls the portion of a playing surface that may be stricken by drumsticks or other percussion implements. According to this aspect of the invention, the barrier may help a student learn to consistently strike only a certain portion of the percussion instrument by serving as a guide. For example, when playing the drums, it is desirable to consistently strike the drumhead close to its center. A novice drum player may not be able to determine whether he or she is striking the center of the drumhead without watching the drumsticks. One embodiment of the present invention provides a barrier that prevents an off-center strike from directly contacting the drumhead, thereby alerting the player through sound or feel that he or she has not struck within a certain distance of the center of the drumhead. With practice, the barrier may guide the student to strike the drum near to the center of the drumhead.

For ease of understanding, and without limiting the scope of the invention, the inventive barrier to which this patent is directed is disclosed below particularly as used in connection with a snare drum. It should be appreciated, however, that the percussion instrument barrier is not limited to use with a snare drum, and that the barrier may be reconfigured for use with other drums and percussion instruments such as cymbals, tom-toms, timpani drums, conga drums, xylophones, vibraphones, gongs, chimes and so on. For purposes of this invention, and without limiting the scope of the invention, a percussion striking implement may be any suitable implement that can be used to strike a playing surface of a percussion instrument. Examples of striking implements include: drumsticks; soft-core mallets; hard-core mallets; and brushes.

In another aspect of this invention, the percussion instrument barrier may provide a practice aid that encourages certain hand, wrist, and arm positioning when addressing a drum. By restricting not only the area in which a percussionist can strike the drum, but also the angle at which the drumsticks can strike the drum, the barrier may encourage the percussionist to use certain hand, wrist, and arm positions. For example, with the percussion instrument barrier attached to the drum, an attempt to strike the drum with a drumstick held at too low of an angle may result in contact with the barrier before the drumhead is hit.

The uses and applications described above are not meant to be limiting features of the invention. It is contemplated that the percussion instrument barrier of this invention also may be used to learn, teach, or practice other instrument playing skills.

In an illustrative embodiment shown in FIGS. 2–6, a drum barrier 10 includes a blocking portion 12 and an opening 15 forming another portion of barrier 10. When positioned on a drum 18, blocking portion 12, such as a blocking surface, prevents drumsticks 14 from contacting drumhead 30 in certain areas and opening 15 allows the drumsticks 14 (or other percussion-striking instruments) to hit other areas of drumhead 30. Blocking portion 12 preferably is solid and continuous. The drum barrier 10 may include a lip 17 to help position the barrier 10 on drum 18. Typically, but not necessarily, barrier 10 assumes the shape of the drumhead 30. Drum barrier 10 shown in FIGS. 2–6 typically is circular in shape. Other shapes and arrangements for a percussion instrument barrier are contemplated as should be apparent to one of skill in the art. Drum barrier 10 typically is made of plastic, but may be formed of any suitable material, such as plexi-glass, poster board, cardboard, fiberglass, metal and so on.

Drum barrier 10 of FIGS. 2–6 is shown attached to a snare drum 18 for purposes of illustration. As discussed, drum 18 includes drumhead 30, a shell 32, and a rim 34. Shell 32 and rim 34 serve to tightly stretch and hold in place drumhead 30. Rim 34 typically extends above the surface of drumhead 30 so that the upper edge 36 of rim 34 is spaced from the drumhead 30. Barrier 10 typically rests on rim 34 of drum 18 so that portion 12 of the drum barrier 10 blocks a predetermined area of the drumhead 30, shown by way of example as a ring-shaped area in FIGS. 2 and 3. Typically, blocking portion 12 is parallel to drumhead 30 and spaced from drumhead 30 by approximately the height of rim 34. Opening 15 of drum barrier 10 allows the drumhead 30 to be stricken by drumsticks or other suitable percussion implements. In many drum applications, particularly the snare drum 18 of FIGS. 2 and 3, the opening 15 is positioned over the center of drumhead 30 and blocking portion 12 is positioned around the edge of drumhead 30.

Preferably, there is little or no direct pathway for transferring vibrations from drumhead 30 to barrier 10 and vice-versa. A direct pathway for vibrations could significantly affect or dampen the volume or tonal quality of the drum. In this respect, drumhead 30 may be vibrationally separated from barrier 10. While some vibrations may be transferred indirectly from drumhead 30 to barrier 10 and vice-versa via shell 32 or other drum components, the lack of significant direct contact between barrier 10 and drumhead 30 may help to vibrationally separate drumhead 30 from barrier 10. Preferably, the amount of vibration effects resulting from the presence of barrier 10 are not significant enough to be noticeable by a musician. In one embodiment, this vibrational separation is achieved by spacing barrier 10 from drumhead 30. This spacing typically is accomplished by supporting barrier 10 on rim 34 or other suitable components of the drum 18. Consequently, the sound quality, tonal quality, and volume produced by drumhead 30 are less affected than those produced by a drumhead with a barrier placed directly on drumhead 30.

Figure 2:
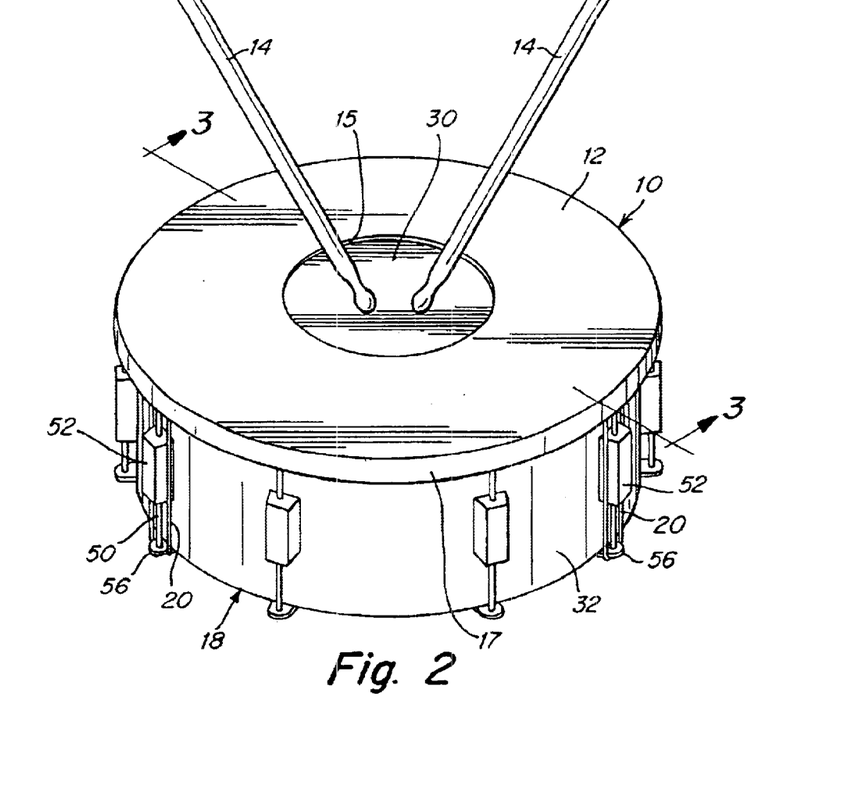
FIG. 2 is a perspective view illustrating one embodiment of a percussion instrument barrier secured to a drum.
Figure 3:
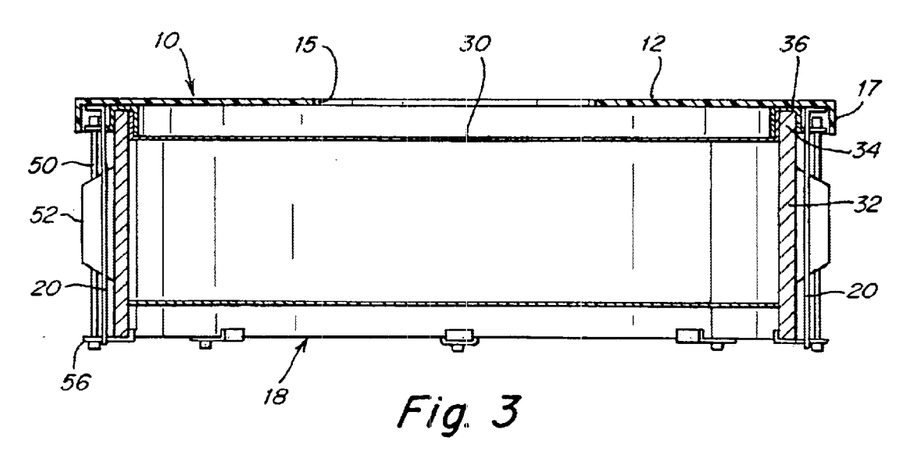
FIG. 3 is a cross-sectional side view of the embodiment illustrated in FIG. 2 taken along the line 3—3 of FIG. 2.
Figure 4:
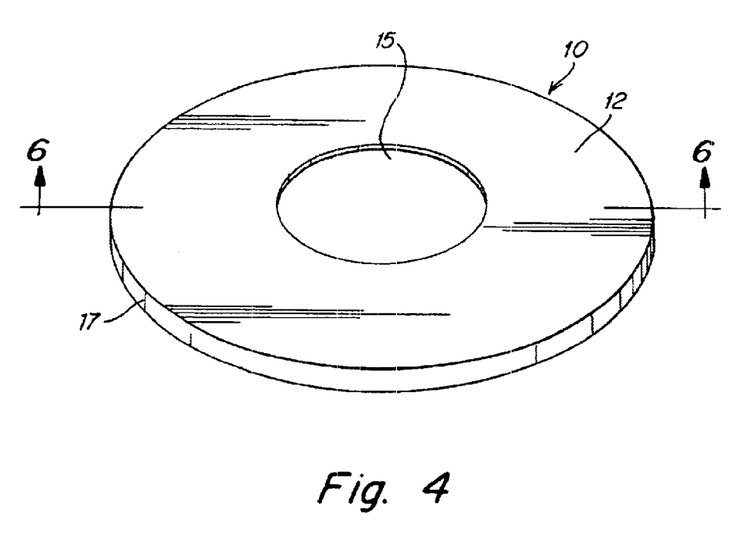
FIG. 4 is a perspective view of the embodiment of a percussion instrument barrier illustrated in FIG. 2.
Figure 5:
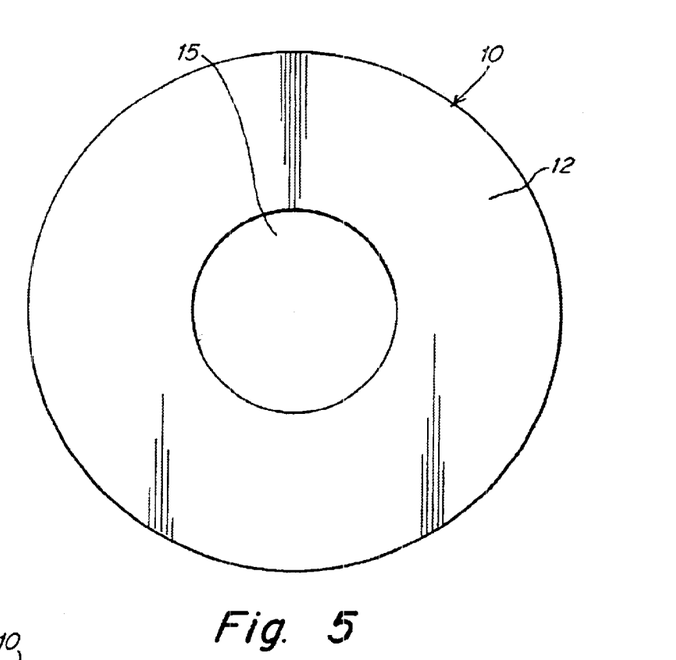
FIG. 5 is a top plan view of the embodiment illustrated in FIG. 4.
Figure 6:
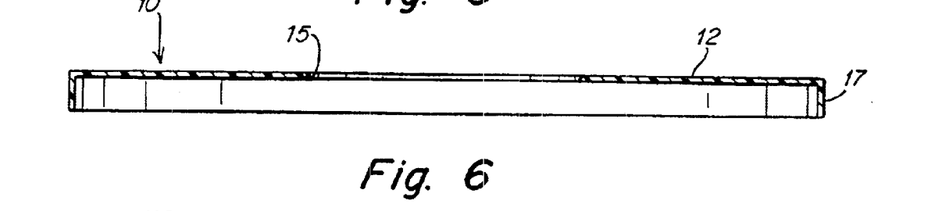
FIG. 6 is a cross-sectional side view of the embodiment illustrated in FIG. 4 taken along the line 6—6 of FIG. 4.

As shown in FIG. 2, holders 20 optionally may be used for securing drum barrier 10 to drum 18. Holders 20 may be elastic cords that are attached to drum barrier 10 near the edge of blocking surface 12 and may be attached to any suitable protrusion on drum 18, such as, for example, a tension rod 50, a lug casting 52, a clamp, or a clip 56. FIG. 3 shows holders 20 attached to clips 56. Other structures for securing the drum barrier 10 to the drum 18 are contemplated. Magnets, adhesives, latches, clips, hook and loop fasteners, (not shown) or any other suitable method of securing the drum barrier 10 to the drum 18 may also be used.

In another embodiment, drum barrier 10 may not be positively attached to the drum 18. Rather, in some applications, the weight of the drum barrier 10 may be sufficient to retain barrier 10 securely on top of the drum 18.

In some embodiments, extra weight may be added to lip 17 or lip 17 may be formed of a heavier material than the rest of drum barrier 10.

Figure 12:
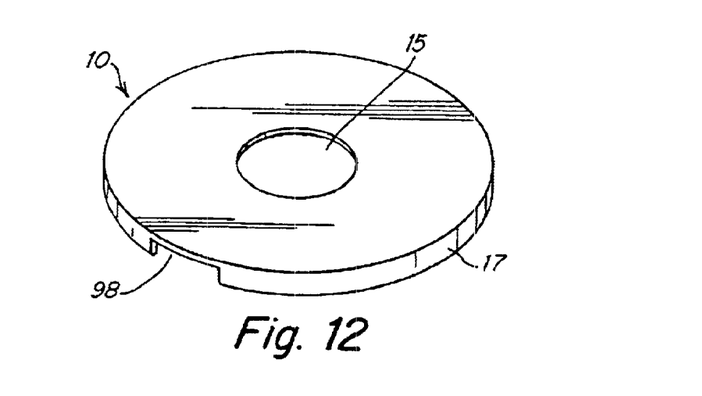
FIG. 12 is a perspective view of yet another embodiment of percussion instrument barrier which includes a cutout along the rim.

FIG. 12 shows another embodiment of drum barrier 10, similar to the embodiment of FIGS. 2–6, but with a cutout 98 in lip 17. Drum barrier 10 is positioned such that cutout 98 is aligned with a throw mechanism (not shown) for the snare of a snare drum. By providing cutout 98, lip 17 does not interfere with the throw mechanism.

Opening 15 may be any suitable shape or size. In an exemplary application when used with a snare drum having a diameter of 14 inches, drum barrier 10 has a diameter of approximately 15½ inches and a centered, circular opening 15 has a diameter of approximately 6½ inches. Preferably, lip 17 is generally perpendicular to the blocking surface 12 and extends approximately ½ inch down the outside of rim 34. An opening 15 of approximately 6½ inches in diameter in this embodiment allows the ends of the drumsticks to hit drumhead 30 without the shaft of the drumsticks hitting blocking surface 12.

Figure 7:
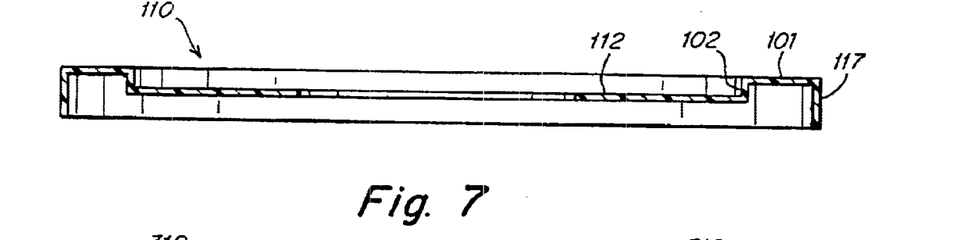
FIG. 7 is a cross-sectional side view of another embodiment of a percussion instrument barrier with a surface closer to the playing surface.

In other embodiments, a blocking portion 112 may be spaced from drumhead 30 by a distance which is greater or less than the height of rim 34. FIG. 7 shows an embodiment 110 that includes a blocking portion 112 which is closer to drumhead 30 than the height of rim 34. In this embodiment, lip 117 does not connect directly to blocking portion 112. Rather, lip 117 is connected to an intermediate leg 101 which rests on rim 34. A spacer arm 102 couples leg 101 to blocking portion 112 and spaces blocking portion 112 a distance above drumhead 30 that is less than the height of rim 34.

Figure 18:
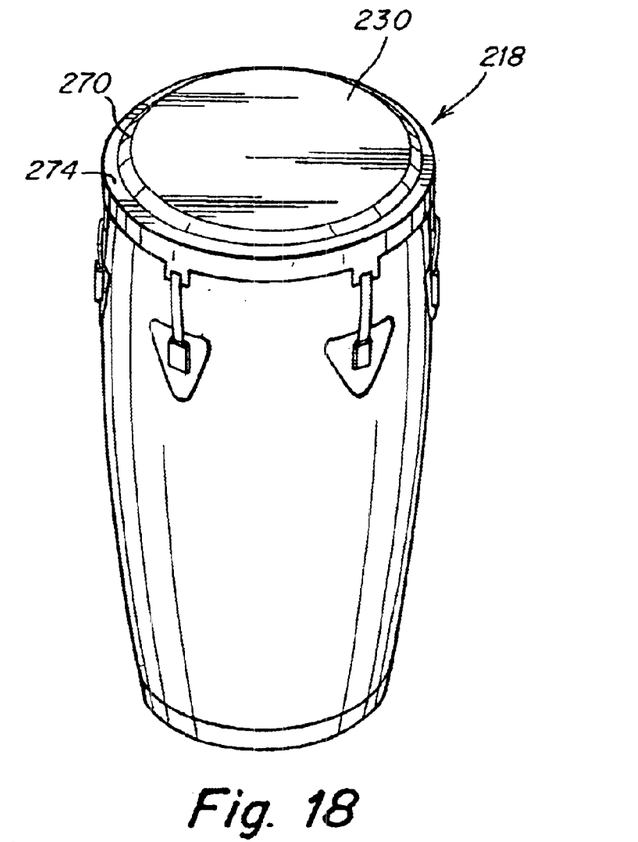
FIG. 18 is a perspective view of a conga drum.
Figure 19:
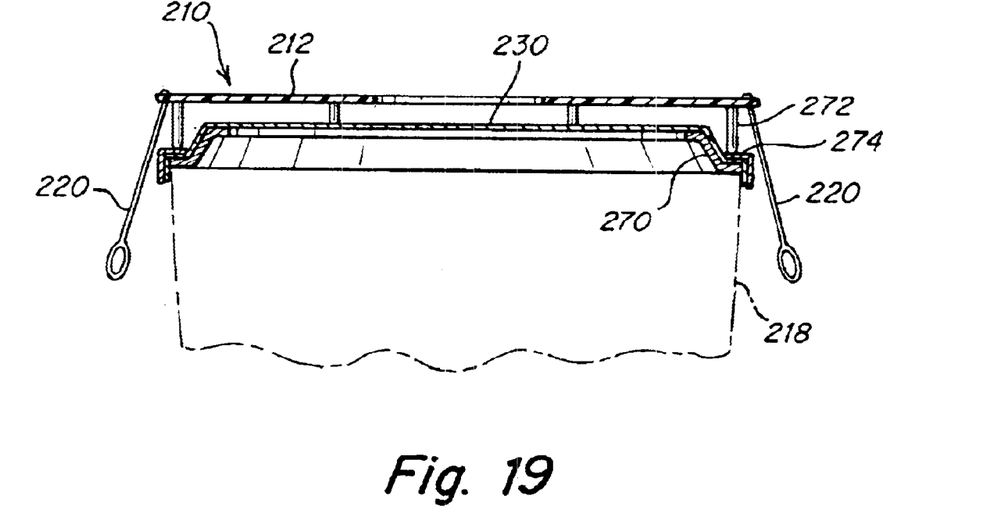
FIG. 19 is a cross-sectional side view of an embodiment of a percussion instrument barrier supported by a conga drum.

On drums or percussion instruments that do not include an upstanding rim, other arrangements may be used to space blocking portion from a drumhead. For example, a conga drum 218, shown in FIG. 18, has a drumhead 230, but no upstanding rim. Drumhead 230 is stretched over a hoop 270 and a horizontal portion, such as a shelf 274 extends around the perimeter of the drumhead 230. FIG. 19 shows an illustrative embodiment of a drum barrier 210 and blocking portion 212 supported on conga drum 218 by legs 272 that rest on shelf 274 of conga drum 218. Holders 220 optionally may be used to secure the drum barrier 210 to the conga drum 218. Legs 272 optionally may be attached to hoop 270 with hook and loop fasteners to provide a removable attachment point. In an alternate embodiment, a substantially continuous lip (not shown) may extend around the perimeter of the barrier 210 to support drum barrier 210 in a spaced arrangement with drumhead 230.

Figure 8:
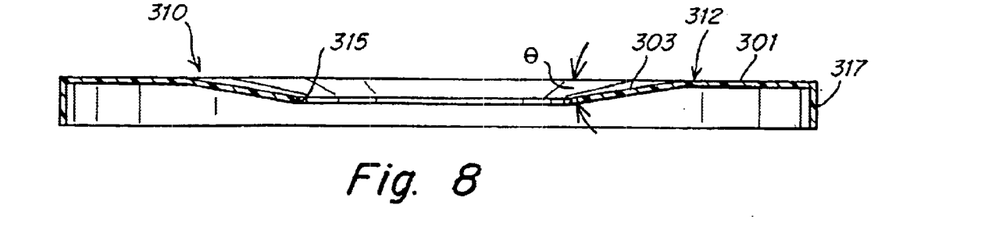
FIG. 8 is a cross-sectional side view of yet another embodiment of a percussion instrument barrier with a slanted surface.

In another embodiment, as shown in FIG. 8, the drum barrier 310 has a slanted or curved blocking portion 312 may be employed such that the distance between the blocking portion 312 and the drumhead varies at different locations of the drumhead. A portion 301 of the blocking portion 312 generally parallel to the drumhead is connected to a portion 303 slanted with respect to the drumhead at an angle θ. Typically, portion 301 is disposed adjacent the lip 317, while portion 303 is disposed adjacent an opening 315. The slanted portion 303 allows the drummer to strike drum 18 with drumsticks at angles that would not be possible with portion 301 extending to opening 315. It is also contemplated that angle θ may be adjustable to alter the angles at which the drummer may address or strike drum 18.

Figure 9:
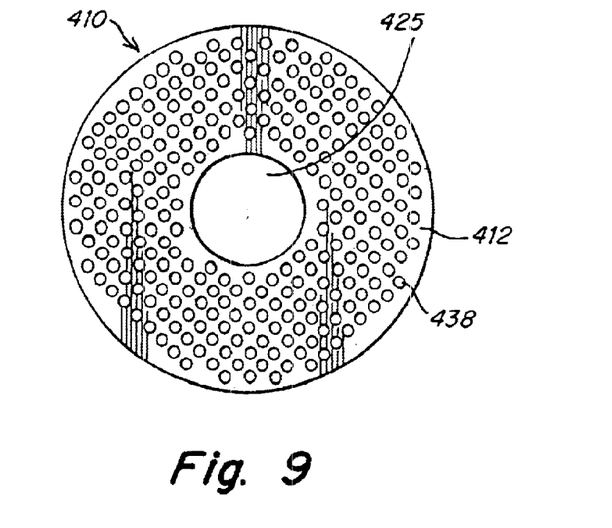
FIG. 9 is a top plan view of another further embodiment of a percussion instrument barrier of this invention.

In other embodiments, the drum barrier 410 may have a blocking portion 412 that is not continuous. In one illustrative embodiment shown in FIG. 9, the blocking portion 412 of barrier 410 may include a plurality of holes 438 or other perforations and still include enough coverage to prevent a drumstick from hitting the drumhead 30 except at opening 425 when playing the drum in a typical manner. The holes 438 may help to lessen any sound dampening effects that blocking portion 412 may produce. In another illustrative embodiment, the blocking portion 412 may include a grid of rigid members or tensioned lines (not shown) such as monofilaments so that drumsticks played at typical angles to the drum 18 would not reach the drumhead 30, but rather would be blocked by the grid.

Figures 10, 11:
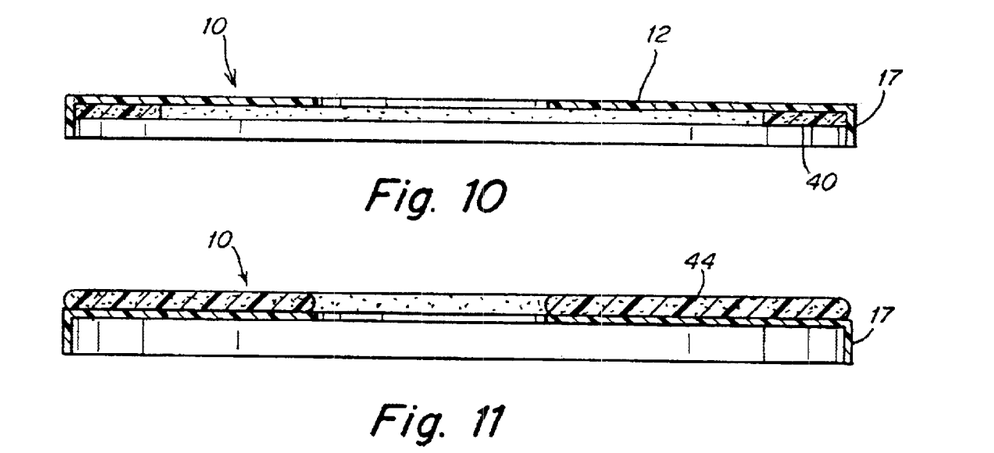
FIG. 10 is a cross-sectional side view of one embodiment of a percussion instrument barrier with dampening pad.
FIG. 11 is a cross-sectional side view of another embodiment of a percussion instrument barrier with a dampening pad.

As shown in FIG. 10, the underside of the drum barrier 10 may include a dampening pad 40 or system which contacts the rim of the drum to reduce vibrations or rattling of the drum barrier 10 when either the drum or drum barrier 10 is stricken with drumsticks.

In another illustrative embodiment shown in FIG. 11, the top of the drum barrier 10 may include padding 44 or another type of dampening system to reduce or alter the sound produced when the drum barrier 10 is stricken.

In some embodiments, various text or musical symbols may be included on the drum barrier 10 as a reminder or learning aid for students. For example, various rudiments may be printed on the top surface of the drum barrier 10.

Figure 13:
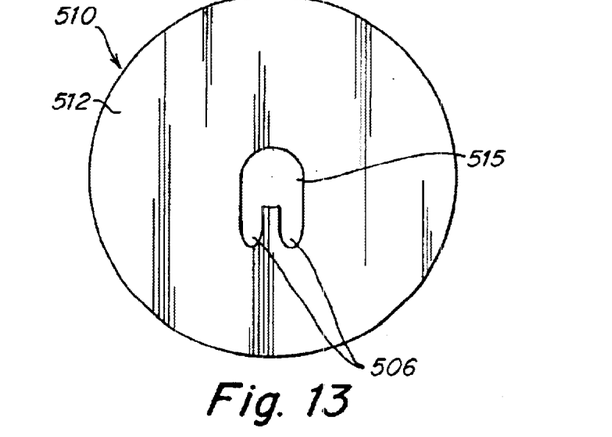
FIG. 13 is a top plan view of another embodiment of a percussion instrument barrier of this invention which has a center opening and two longitudinal openings extending from the center opening.

If a much smaller center opening is desired, the blocking surface may be lowered or removed in the areas where the shafts of the drumsticks may contact the blocking surface. An example of such an embodiment is illustrated in FIG. 13. Drum barrier 510 includes a blocking portion 512 that has a smaller opening 515. Two longitudinal openings 506 extend from opening 515 which allows drumsticks to strike drumhead 30 at a lower angle than if no longitudinal openings 506 extend from opening 515.

Figure 14:
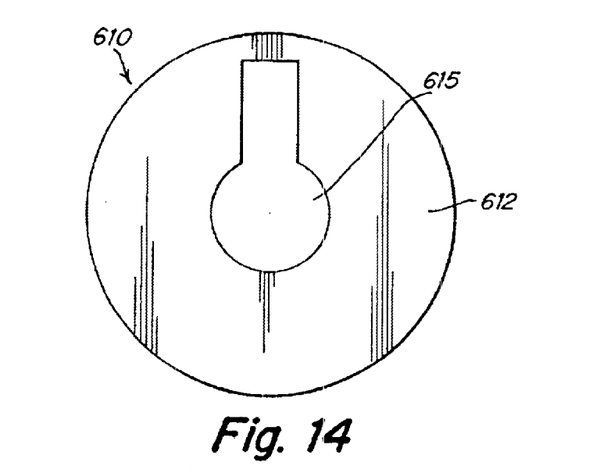
FIG. 14 is a top plan view of yet another embodiment of a percussion instrument barrier of this invention.
Figure 15:
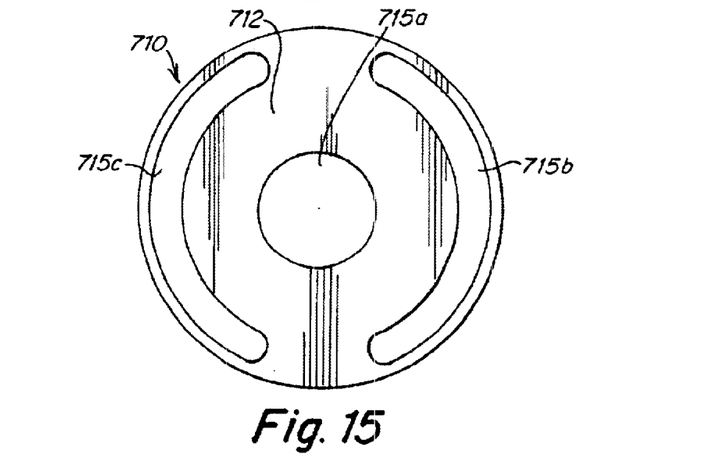
FIG. 15 is a top plan view of yet another further embodiment of a percussion instrument barrier of this invention which has more than one opening.

Although one application of the percussion instrument barrier of this invention is as an aid to helping a musician to learn to strike a drum near the center of the drumhead, it may be used for other purposes as well. For example, FIG. 14 shows another illustrative embodiment of a drum barrier 610 having keyhole-shaped opening 615 in the blocking portion 612. The keyhole-shaped opening 615 allows the student to practice striking drumhead 30 closer to the edge when it is desirable to do so. Other opening 15 shapes are contemplated, such as a square, an oval, a triangle, a ring, or any other suitable shape. Alternately, the percussion instrument barrier 10 may be used to practice hitting a percussion instrument in more than one predetermined area. FIG. 15 shows one illustrative embodiment in which three openings of different shapes are provided in the blocking portion 712 of drum barrier 710. In addition to center opening 715a, two outer openings 715b and 715c are disposed closer to the rim of the drum.

Figure 16:
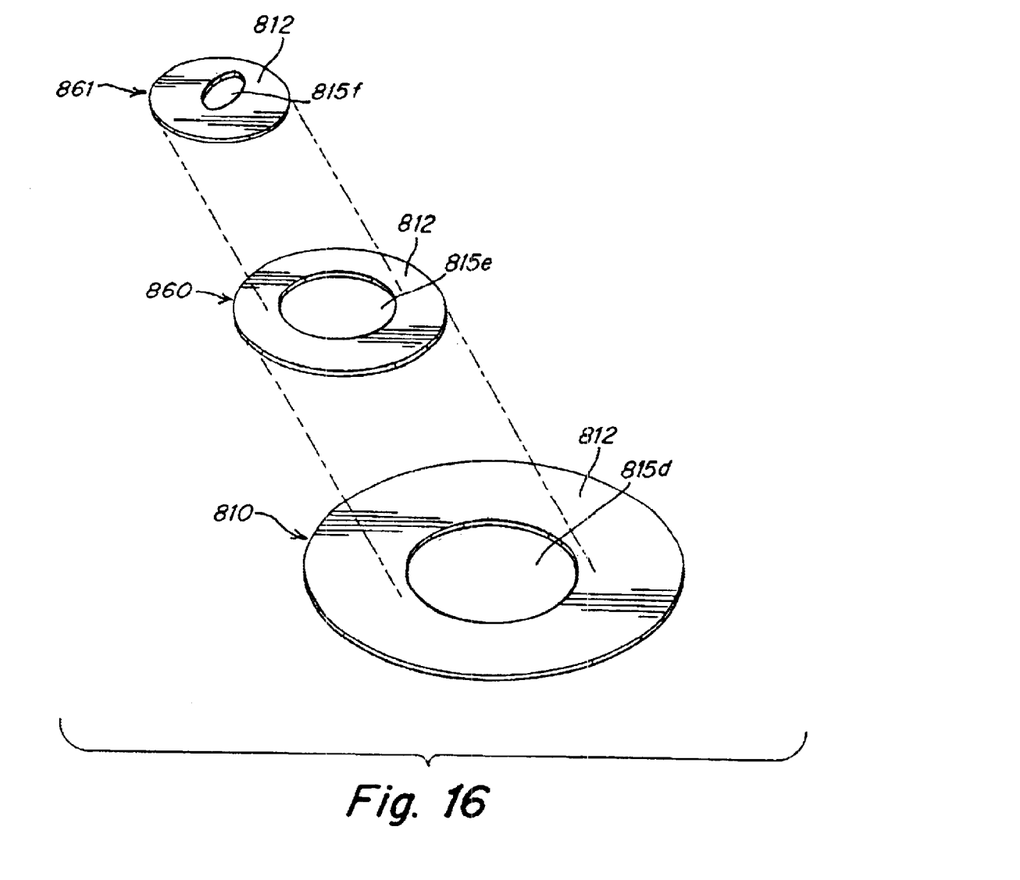
FIG. 16 is an exploded perspective view of yet another further embodiment of a percussion instrument barrier which includes additional rings for adjusting the size and/or location of the opening.
Figure 17:
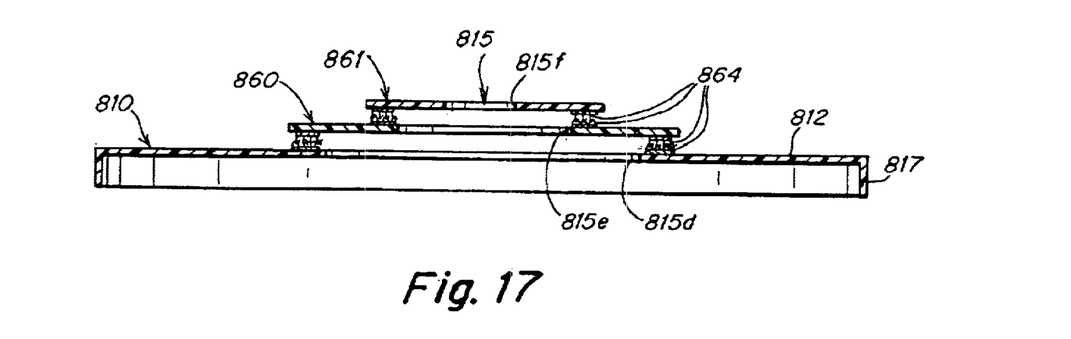
FIG. 17 is a cross-sectional side view of the embodiment illustrated in FIG. 16.

In alternate embodiments, the opening may be adjustable so that as a percussionist gains experience, the size and/or location of the opening may be varied. For example, a novice percussionist may use a drum barrier with an opening having a diameter that is 30% to 50% of the diameter of the drum barrier. A more advanced percussionist may desire an opening that has a diameter less than 30% of the diameter of the drum barrier. Extra pieces, such as rings with progressively smaller openings may be attached to the drum barrier for adjusting the size and/or shape of the opening 815, as shown in FIGS. 16 and 17. One or two additional rings 860 and 861 may be added to decrease the size of opening 815 in the blocking portion 812 or to shift the location of the center of opening 815 relative to the drumhead. Ring 860 includes an opening 815e that is smaller than opening 815d on drum barrier 810. Ring 860 may be attached to barrier 810 or merely be allowed to rest on it. When ring 860 is placed on drum barrier 810, the area of available playing surface is reduced. Ring 861 includes an opening 815f that is smaller than openings 815d and 815e, offset from the center, and shaped as an oval. Ring 861 may be attached to ring 860 or merely rest on it. If rings 860 and/or 861 are attached, hook and loop fasteners 864 may be used. Alternately, rings 860 and 861 may be attached to drum barrier 810 with an interference fit, a low tack, pressure sensitive adhesive, magnets, latches, clips or any other suitable device.

Figure 20:
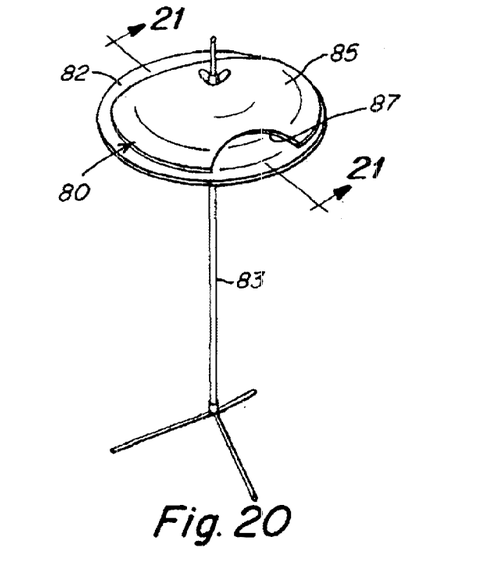
FIG. 20 is a perspective view of an embodiment of a percussion instrument barrier disposed above a cymbal.
Figure 21:
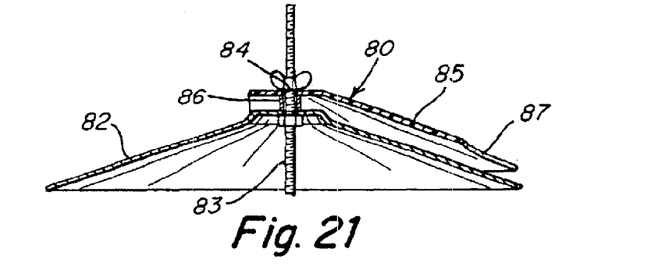
FIG. 21 is a cross-sectional side view of the embodiment of FIG. 20 taken along the line 21—21 of FIG. 20.
Figure 22:
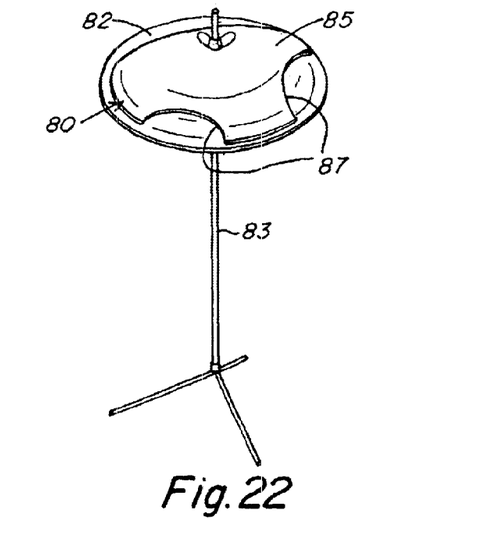
FIG. 22 is a perspective view of another embodiment of a percussion instrument barrier disposed above a cymbal.

FIGS. 20 to 22 show another embodiment of a percussion instrument barrier 80 to be used with a cymbal 82. Cymbal barrier 80 includes a blocking portion 85 and an opening 87. Cymbal barrier 80 is attached above cymbal 82 on a stand 83 so that cymbal barrier 80 does not contact the playing surface of cymbal 80. Blocking portion 85 alerts the drummer if he or she has not stuck the portion of the cymbal 80 corresponding to opening 87. Opening 87 may be any suitable shape and may be surrounded by the blocking portion 85 or may extend to the edge of the cymbal barrier 80 as shown by way of example in FIGS. 20 to 22. Preferably, barrier 80 includes a hole 84 for placing barrier 80 on stand 83 and a collar 86 to space the blocking portion 85 above the playing surface of cymbal 82.

While the invention has been described in conjunction with specific embodiments thereof, many alternatives, modifications, and variations will be apparent to those skilled in the art. Accordingly, embodiments as set forth herein are intended to be illustrative of the various aspects of the invention, not limiting. Various changes may be made without departing from the spirit and scope of the invention.

What is claimed is:

1. An apparatus for controlling the locations to be stricken on a playing surface of a percussion instrument, comprising:
a barrier having a first portion constructed and arranged to prevent a first area of a playing surface of a percussion instrument from being stricken and a second portion constructed and arranged to allow a second area of the playing surface to be stricken, the barrier being constructed and arranged to not directly contact the playing surface.

2. The apparatus of claim 1, wherein the barrier is constructed and arranged to be spaced from the playing surface.

3. The apparatus of claim 1, wherein the percussion instrument is a drum having a rim surrounding a drumhead.

4. The apparatus of claim 3, wherein the barrier is supportable on the rim.

5. The apparatus of claim 3, further comprising a holder for securing the barrier to the drum.

6. The apparatus of claim 1, wherein the second portion has a substantially circular shape.

7. The apparatus of claim 6, wherein the second portion has a diameter that is greater than 30% and less than 50% of the diameter of the barrier.

8. The apparatus of claim 1, further comprising a damper attached to an underside of the barrier structured to face the rim.

9. The apparatus of claim 1, further comprising a sound reducer disposed on a top side of the barrier.

10. The apparatus of claim 1, wherein the first portion includes a portion arranged to be slanted relative to the playing surface.

11. The apparatus of claim 1, wherein the first portion includes perforations.

12. The apparatus of claim 1, wherein the second portion is an opening disposed off-center in the barrier.

13. The apparatus of claim 1, in combination with a percussion instrument.

14. A practice aid for a drum, comprising:
a drum guide having an opening, the drum guide being constructed and arranged to be supported by a rim of the drum so that the opening is spaced from the rim of the drum, the drum guide being constructed and arranged to cover a first portion of a drumhead and expose a second portion of the drumhead that is aligned with the opening in the drum guide and spaced from the rim of the drum.

15. The practice aid of claim 14, in combination with the drum, the drum comprising a drumhead.

16. The practice aid of claim 15, wherein the guide is spaced from the drumhead.

17. The practice aid of claim 14, wherein the opening is centered on the drum guide.

18. A method of practicing drum-playing techniques comprising:
covering a first portion of a drumhead with a barrier such that when drumsticks strike the barrier, the drumhead does not produce sound; and
leaving a second portion of the drumhead exposed such that drumsticks can strike the second portion of the drumhead without the sound quality of the drumhead being significantly affected.

19. In combination:
a percussion instrument having a vibrating surface; and
a barrier supported on the percussion instrument, the barrier having a blocking portion blocking access to a first area of the vibrating surface by a percussion striking implement, and an opening allowing access to the vibrating surface in a second area by a percussion striking implement;
wherein the barrier is vibrationally separated from the vibrating surface, so that the barrier does not affect the vibrating surface.

20. The combination of claim 19, wherein the barrier is spaced from the vibrating surface.

21. The combination of claim 19, wherein there is no direct physical contact between the barrier and the vibrating surface.

22. The combination of claim 19, wherein the percussion instrument has an outer shell and the blocking portion is dispose adjacent the shell and wherein the opening is substantially centered relative to the vibrating surface.

23. The combination of claim 19, wherein the percussion instrument is a drum.

24. In combination:
a percussion instrument having a rim supporting a playing surface; and
a barrier supported at the rim, the barrier preventing access to a first portion of the playing surface, and allowing access to a second portion of the playing surface through an opening defined by the barrier, the first portion being disposed between the rim and the second portion.

25. The combination of claim 24, wherein the barrier is spaced from the first portion of the playing surface.

* * * * *